(12) United States Patent
Lee et al.

(10) Patent No.: US 6,340,123 B1
(45) Date of Patent: Jan. 22, 2002

(54) UNIVERSAL FLOW CHANNEL

(76) Inventors: Ching-Chin Lee, 7678 Oxgate Ct., Hudson, OH (US) 44236; Gary Robert Burg, 3205 Waterford Ave., NW. Canton, OH (US) 44708; Ernest Wilford Looman, Jr., 664 Clark Dr., Tallmadge, OH (US) 44278; Bruce Joseph Turner, 275 Summit St.; Malcolm George Marshall, 122 Apple Dr., both of Wadsworth, OH (US) 44281

(*) Notice: Subject to any disclaimer, the term of this patent is extended or adjusted under 35 U.S.C. 154(b) by 0 days.

(21) Appl. No.: 09/424,677

(22) PCT Filed: Oct. 31, 1997

(86) PCT No.: PCT/US97/20054

§ 371 Date: Mar. 30, 2000

§ 102(e) Date: Mar. 30, 2000

(87) PCT Pub. No.: WO99/22927

PCT Pub. Date: May 14, 1999

(30) Foreign Application Priority Data

Oct. 31, 1997 (US) .................. PCT/US97/20054

(51) Int. Cl.⁷ .................. B05B 1/14
(52) U.S. Cl. .................. 239/552; 239/553; 239/553.5; 239/590; 239/590.5; 239/593; 425/461
(58) Field of Search .................. 239/553, 553.5, 239/552, 590, 590.5, 592, 593, 594, 568, 597; 425/461, 466, 467

(56) References Cited

U.S. PATENT DOCUMENTS

| | | | |
|---|---|---|---|
| 1,239,373 A | * 9/1917 | Farmer et al. | 239/594 |
| 3,416,190 A | 12/1968 | Mehnert | 18/14 |
| 3,561,053 A | 2/1971 | Pearson | 18/14 |
| 3,676,038 A | 7/1972 | Orzechowski et al. | 425/464 |
| 3,938,925 A | 2/1976 | Lees | 425/198 |
| 3,956,056 A | 5/1976 | Boguslawski et al. | 156/500 |
| 4,017,240 A | 4/1977 | Nelson | 425/192 |
| 4,032,279 A | 6/1977 | Kim | 425/382 |
| 4,076,477 A | 2/1978 | Hacke | 425/192 |
| 4,290,989 A | 9/1981 | Topor et al. | 264/142 |
| 4,877,393 A | * 10/1989 | Lo | 425/461 |
| 4,990,293 A | 2/1991 | Macosko et al. | 264/40.1 |
| 5,158,730 A | 10/1992 | Pawelczyk et al. | 264/141 |
| 5,221,541 A | 6/1993 | Arbour et al. | 425/188 |
| 5,273,595 A | * 12/1993 | Tomic et al. | 425/461 |
| 5,643,618 A | 7/1997 | Huberg et al. | 425/382.4 |

FOREIGN PATENT DOCUMENTS

| | | | |
|---|---|---|---|
| DE | 0874562 | 4/1953 | 63/73 |
| DE | 874562 | * 4/1953 | 239/590.5 |
| EP | 022643 | 6/1987 | B29C/55/18 |
| EP | 0367749 | 5/1990 | B29C/47/14 |
| EP | 0657272 | 6/1995 | B29C/47/14 |
| JP | 3270922 | * 12/1991 | 425/461 |

OTHER PUBLICATIONS

Patent Abstracts of Japan Publications #03,270,922.
International Search Report PCT/US97/20054.

* cited by examiner

Primary Examiner—David A. Scherbel
Assistant Examiner—Dinh Q. Nguyen (57) ABSTRACT

Apparatus for directing the flow of material from a supply source to one or more shaping dies has a flow channel therein. A flow directing insert (34A) located in the downstream region of the flow channel spreads the material toward the outer walls and improves uniformity of flow in an exit zone (40). In the downstream region (11), the channel height is gradually decreased and levels off near the exit. The flow channel may be split into two or mom flow branches (15A, 15B), each flow branch having a flow directing insert (34A) therein.

26 Claims, 8 Drawing Sheets

UNIVERSAL FLOW CHANNEL

TECHNICAL FIELD

This invention pertains to the an of methods and apparatuses for directing the flow of polymeric material from a supply source to one or more shaping dies.

BACKGROUND ART

In the art it is known to provide means for directing the now of various types of polymeric material from a supply source such as an extruder to one or more shaping dies. There are several factors which affect how the material flows within the flow channel. Considerations of wall friction, stretching and compression of the material, pressure loss and clamping force are factored in flow channel construction. For example, wall friction tends to slow the flow of material near the walls so that the flow of material near the center is faster producing undesirable results.

European Patent Document No. 0 226 434 discloses a polymer sheet produced by advancing a workpiece of polymeric material in the longitudinal direction between two pairs of opposed working surfaces of a die, so that the material of the workpiece flows simultaneously in the longitudinal direction (Z) and the lateral direction (Y) while decreasing in thickness in the (X) direction. A first pair of working surfaces of the die include opposed protrusions that squeeze the workpiece more at the center than at the edges. In this disclosure, the outlet ends of the protrusions extend the entire width of the channel between the second pair of working surfaces and the workpiece is pressed between two protrusions Japanese Patent Document No. 03270922 discloses a pair of truncated quadrangular pyramid-like projections provided in a converging die head. The width of each projection increases toward the efflux port and the top faces of the projections are nearly parallel to each other. The efflux port end of each of the projections is sloped away from the top face which provides a slight increase in depth of the flow channel.

Moving the material through turns or over/around object, may cause unpredictable visco-elastic effects. The problem of non-uniform material flow and undesirable visco-elastic effects are addressed in the present invention.

The present invention is directed to the downstream region of a flow channel in an apparatus for directing the flow of polymeric material from a supply source to one or more shaping dies. The inventive construction of the downstream region provides for increased uniformity of flow across the entire width of the exit orifice. The present invention is further directed to balancing the flow of polymeric material between two or more flow passages.

DISCLOSURE OF THE INVENTION

In accordance with the practice of the present invention, there is provided a new and improved method and apparatus for directing the flow of material from a supply source to one or more shaping dies.

More particularly, an apparatus for directing the flow of polymeric material from a supply source to one or more shaping dies includes a flow channel having an inlet communicating with a supply orifice for receiving the material. The flow channel is defined by opposite side walls, an upper wall, and a lower wall. The flow channel includes a downstream region having a first zone in flow communication with the inlet, and a second zone in flow communication with die first zone, the first and second zones being associated with a common centerline, the side walls of the second zone diverging in opposite lateral directions generally symmetrically about the centerline and associated with an angle, α. The apparatus is characterized by a flow directing insert located within the second zone positioned adjacent to the lower wall, the flow directing insert having sloped side surfaces intersecting a generally planar top surface, the top surface being spaced from the upper wall in the second zone.

According to another aspect of the invention, the flow channel includes a third zone In flow communication with the second zone for directing the raw of the material into the one or more shaping dies, the lower wall of the third zone being generally flush with the top surface of the flow directing insert.

According to another aspect of the invention, the third zone includes an exit orifice the exit orifice being associated with a lateral width wherein the exit orifice width is greater than an associated maximum lateral width of the flow directing insert.

According to yet another aspect of the invention, the upper wall and the lower wall of the flow channel in the second zone are disposed at an angle β to one another to effect a gradual decrease in a channel height in the second zone.

According to yet another aspect of the invention, the downstream region of the flow channel includes a pair of diverging flow branches in flow communication with the inlet, each of the flow branches including a flow directing insert located within each of the second zones.

According to yet another aspect of the invention, a flow directing insert for use in an apparatus for directing the flow of polymeric material from a supply source to one or more shaping dies is provided. The flow directing insert is characterized by a lateral centerline, a generally planar top surface, a bottom surface, and sloping side surfaces extending between the bottom surface and the top surface.

According to yet another aspect of the invention, the flow directing insert is further characterized by an increasing lateral width in symmetrical manner relative to the lateral centerline.

One advantage of the present invention is the reduction of visco-elastic effects in the extruded material.

Another advantage of the present invention is the improved uniformity of flow of polymeric material across the entire width of an exit orifice.

Another advantage of the present invention is that the flow of material between two separate flow branches of a flow channel is balanced.

Another advantage of die invention is the reduction of the projected area of the region filled with the polymeric material which decreases the required clamping force for a predetermined flow rate.

Still other benefits and advantages of the invention will become apparent to those skilled in the art upon a reading and understanding of the following specification.

BRIEF DESCRIPTION OF THE DRAWINGS

The invention may take physical form in certain parts and arrangement of parts a preferred embodiment of which will be described in detail in this specification and illustrated in the accompanying drawings which form a part hereof and wherein.

DETAILED DESCRIPTION OF THE INVENTION

Figure 1:
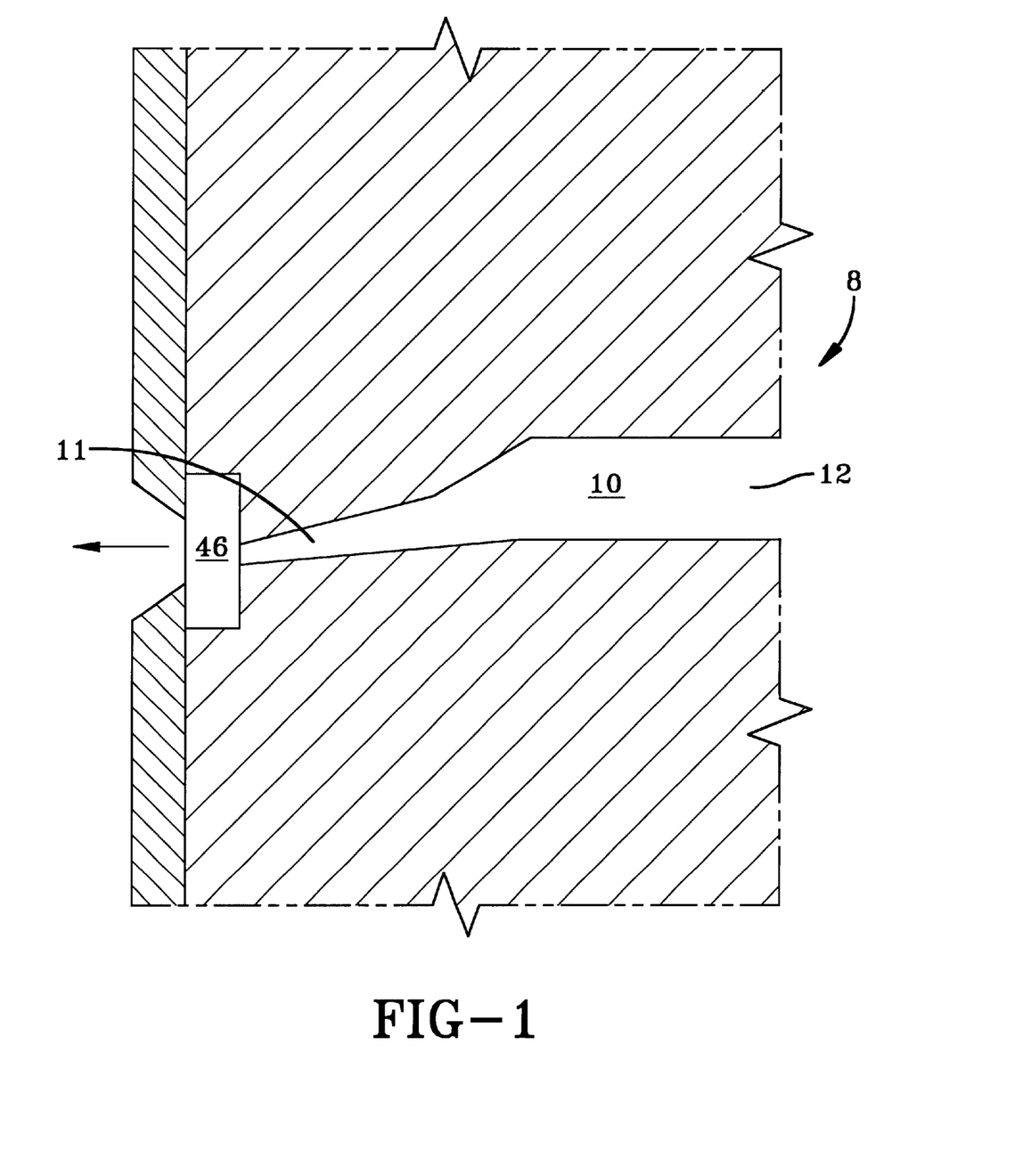
FIG. 1 is a side sectional view of an apparatus far directing the flow of polymeric materials from an extruder to one or more shaping dies.

Referring now to the drawings wherein the showings are for purposes of illustrating a preferred embodiment of the invention only and not for purposes of limiting the same, FIG. 1 shows an apparatus 8 having at least one Dow channel 10 therein for directing the flow of polymeric material. The present invention is directed to the design characteristics of a flow channel 10 which provide more uniform flow to the shaping die, particularly when the material is polymeric in nature. In particular, the present invention is directed to the downstream region 11 of flow channel 10 just prior to the material flowing into a die assembly 46. Flow channel 10 includes an inlet passage 12 which communicates with a supply source as is known in the art and is not shown here. It is contemplated that the invention provides the best results when the polymeric material has a symmetric velocity distribution with respect to the centerline of the flow cross-section immediately prior to flowing into the downstream region 11.

Figure 2:
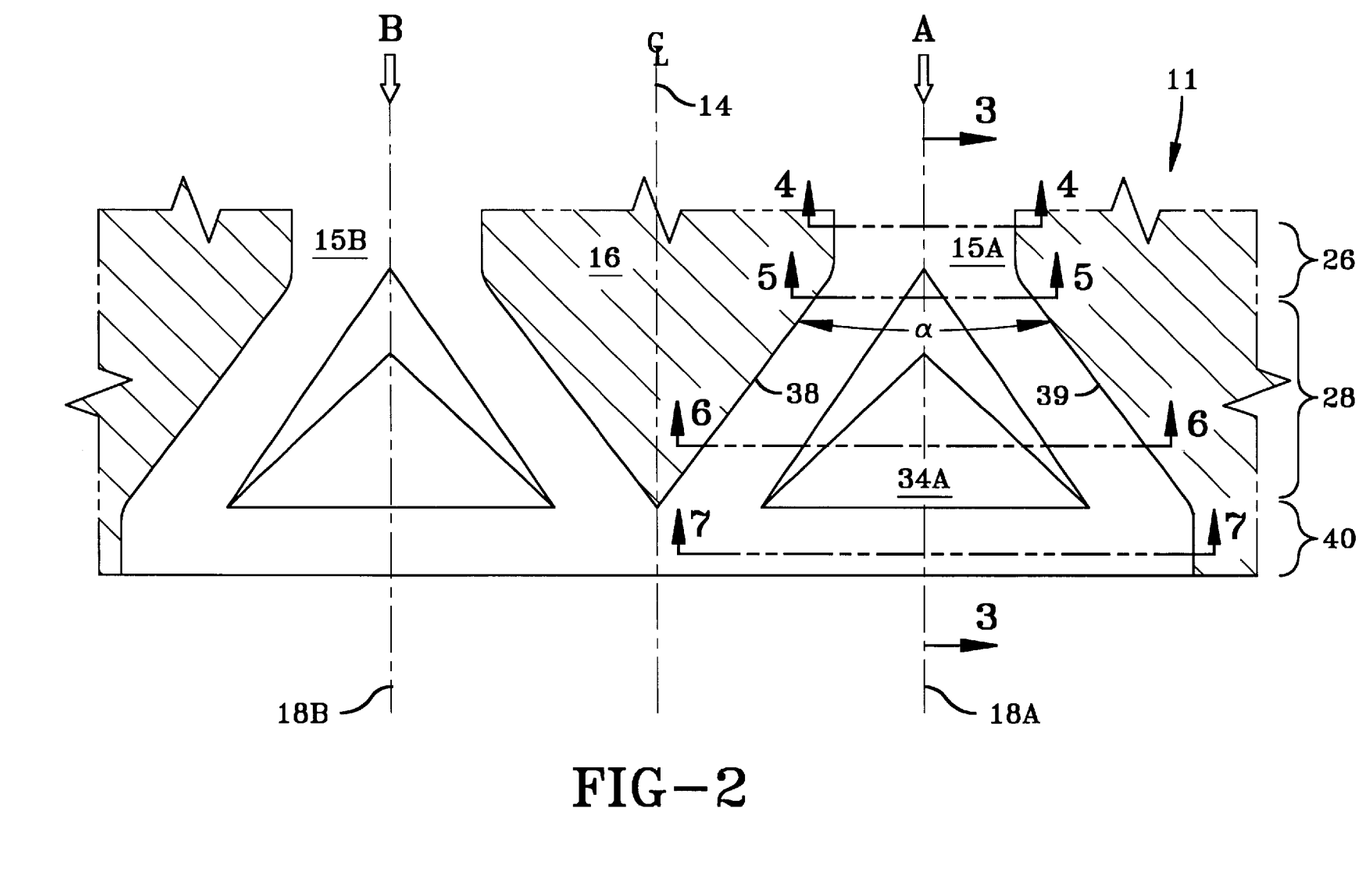
FIG. 2 is a top sectional view of a downstream region of a flow channel.

With respect to FIG. 2, a sectional view of a downstream region 11 of one embodiment of a flow channel is shown. In this embodiment, the flow of polymeric material from the supply source, not shown, is split into first and second streams, indicated by arrows A, B before entering downstream region 11. The downstream region 11 is generally symmetric about centerline 14 and includes first and second flow branches 15A, 15B, Each of the branches 15A, 15B also have respective centerlines 18A, 18B which provide general lateral symmetry within the branches. Located within each of the flow branches 15A. 158 is a flow directing insert 34A.

With particular attention to the right branch 15 A, the features of die downstream region 11 of flow channel 10 will he more fully described. For ease of illustration, the downstream region 11 of flow channel 10 will be described in terms of "upper walls", "lower walls", "lateral direction", etc. in accordance with the accompanying drawings. However, it should be readily understood by those skilled in the relevant art that the apparatus 3 may have other orientations during use.

The right branch 15A is a continuous passage from entry zone 26 to exit zone 40. The entry zone 26, receives the preferably symmetric flow of polymeric material. Generally, the flow in die entry zone 26 is in a direction parallel to the main centerline 14, In a second zone, also called the spread out and balancing zone 28, the width of the first branch 15A increases in a uniform manner symmetric about right branch centerline 18A. In the spread out and balancing zone 28, the side walls 38, 39 diverge to form a triangular region associated with an included angle, α. The included angle, α, may be between 40° and 120°. In the preferred embodiment, angle α a is between 60° and 90°. The flow-directing insert 34A is positioned within the spread out and balancing zone 28. As shown in FIG. 2, the insert 34A is spaced from each of the side walls 38, 39 so that the flow of material is not interrupted near side walls 38, 39. The shape of the insert 34A urges the polymeric material toward the side walls 38, 39 of the right branch 15A by restricting the flow along the centerline 18A. The flow-directing insert 34A further acts to spread out and balance the flow, and compress the polymeric material.

Figure 3:
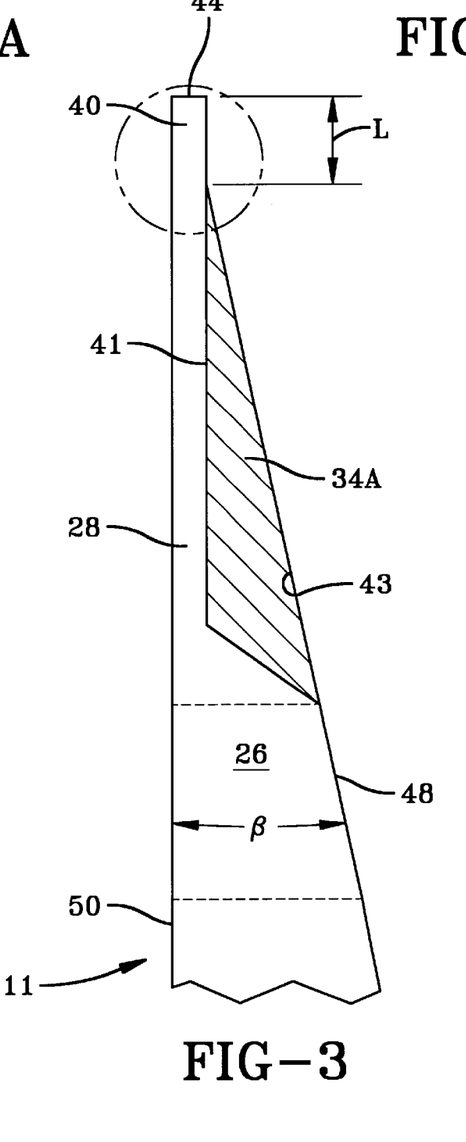
FIG. 3 is a side sectional view of the downstream region of a now channel taken along the line 3—3 of FIG. 2.
Figure 3A:
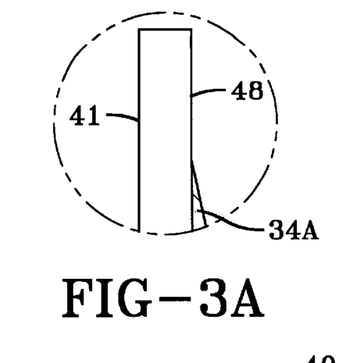
FIGS. 3A and 3B are enlarged views of a section of FIG. 3.

With reference to FIG. 3, in die downstream region 11 of flow channel 10, the dashed lines serve to illustrate the location of entry zone 26, spread out and balancing zone 29, and exit zone 40. As is shown, the flow directing insert 34A includes a generally planar top surface 41 and a bottom surface 43 which is positioned adjacent to the lower wall 48.

Another feature of the invention illustrated in FIG. 3 is the preferred arrangement of upper wall 50 with respect to lower wall 48. Upper wall 50 and lower wall 48 are preferably not parallel, but are disposed at an angle β to one another for gradually decreasing the channel height along the length of the downstream region. The preferred range for β is between 5° and 30°.

Figure 3B:
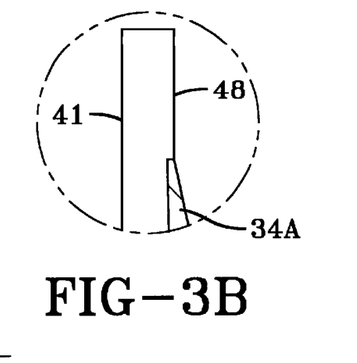

Yet another feature of the invention illustrated in FIG. 3 is the more abrupt decrease in the flow channel height at the center of the flow branch 15A due to the presence of flow directing insert 34A. Throughout the downstream region 11 of the flow channel 10, the channel height decreases without increasing even in the region encompassing the flow directing insert 34A. It has been found that using a flow-directing insert which first compresses die polymeric material and then allows expansion in the flow creates undesirable visco-elastic effects in the polymeric material. Therefore, the preferred flow-directing insert 34A causes the channel height in the spread out and balancing zone 28 to decrease monotonically and does not deepen again as the polymeric material flows over the insert 34A. The top surface 41 of the flow directing insert 34A is generally planar. In the exit zone 40, the bottom wall 48 or the flow branch 15A is also preferably planar. In a preferred embodiment, the bottom wall 48 is flush with the plane of the top surface 41, In a practical application, there may be a slight step-down at the end of the insert 34A as shown in FIG. 3B. The preferred flow directing insert 34A includes sloped side walls 42. In the preferred embodiment, only a single insert 34A is utilized. The upper wall 50 of the flow channel remains in a single plane throughout the length of the flow branch 15A. This arrangement is simpler in design than some prior art apparatus which provide a pair of protruding surfaces.

The length, L, of the exit zone 40 is herein defined as the distance from the end of the flow-directing insert 34A to an exit orifice 44. The length of the exit zone 40 affects the pressure loss and the visco-elastic effects. The longer the exit zone 40, the greater the pressure loss and the lower the visco-elastic effects and vice-versa. Therefore, in the preferred embodiment, the length of the exit zone 40 is optimized to provide acceptable ranges of pressure loss and visco-elastic effects.

With particular reference to FIGS. 4–7, the variances in the cross-sectional shape of a preferred embodiment of the right branch 15A of the downstream region 11 are shown. Each of the sectional views are taken perpendicular to the centerline 18A of the right branch 15A. For the sake of simplicity, right branch 15A will be discussed in detail below. However, left branch 15B, is a mirror image of right branch 15A with centerline 14 being the axis of symmetry.

Figure 4:
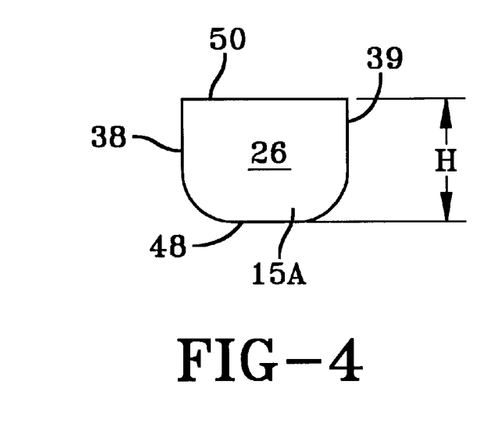
FIGS. 4–7 are cross-sectional views of the downstream region of the flow channel.

FIG. 4 is a sectional view of the entry zone 26 showing upper wall 50, lower wall 48, and side walls 38, 39. As is shown in the preferred embodiment, the junctions of lower wall 37 with side walls 38, 39 are contoured.

Figure 5:
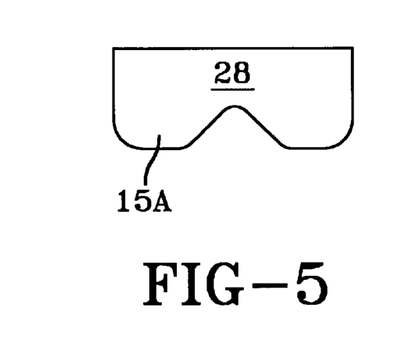

FIG. 5 is directed to the initial portion of the spread out and balancing zone 28 and shows how the flow-directing insert 34A effects the cross-sectional shape of right branch 15A The flow-directing insert 34A is generally symmetrically positioned within right branch 15A. In other words, a centerline of the flow-directing insert is aligned with the centerline of the right branch 15A in the spread out and balancing zone 28. In the spread out and balancing zone 28, the associated width of right branch 15A gradually increases along a length thereof, and the channel height gradually decreases.

Figure 6:
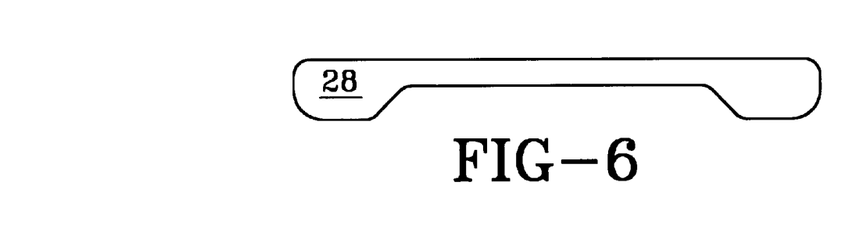

FIG. 6 shows a sectional view further downstream than that shown in FIG. 5, but before the exit zone 40.

Figure 7:
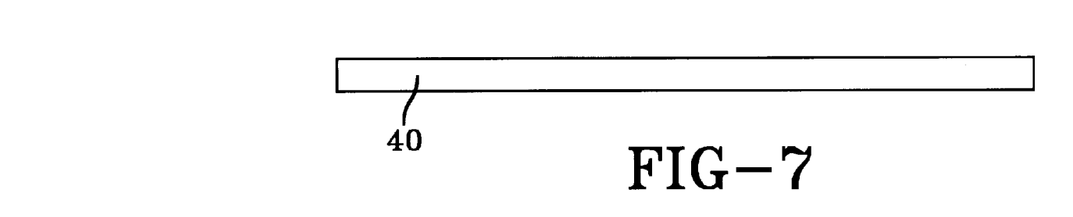

FIG. 7 is a sectional view of the exit zone 40. In a preferred -embodiment, the channel height remains constant, in the exit zone 40. It is, however, within the scope of the present invention to decrease the channel height along its length in exit zone 40.

Referring again to FIG. 2, in one embodiment of the invention, the exit zone 40 is associated with a lateral width which is greater than the maximum width of right flow directing insert 34A. It is within the present invention for exit zone 40 to extend laterally so that it communicates with both right flow branch 15A and left flow branch 15B.

Figure 8:
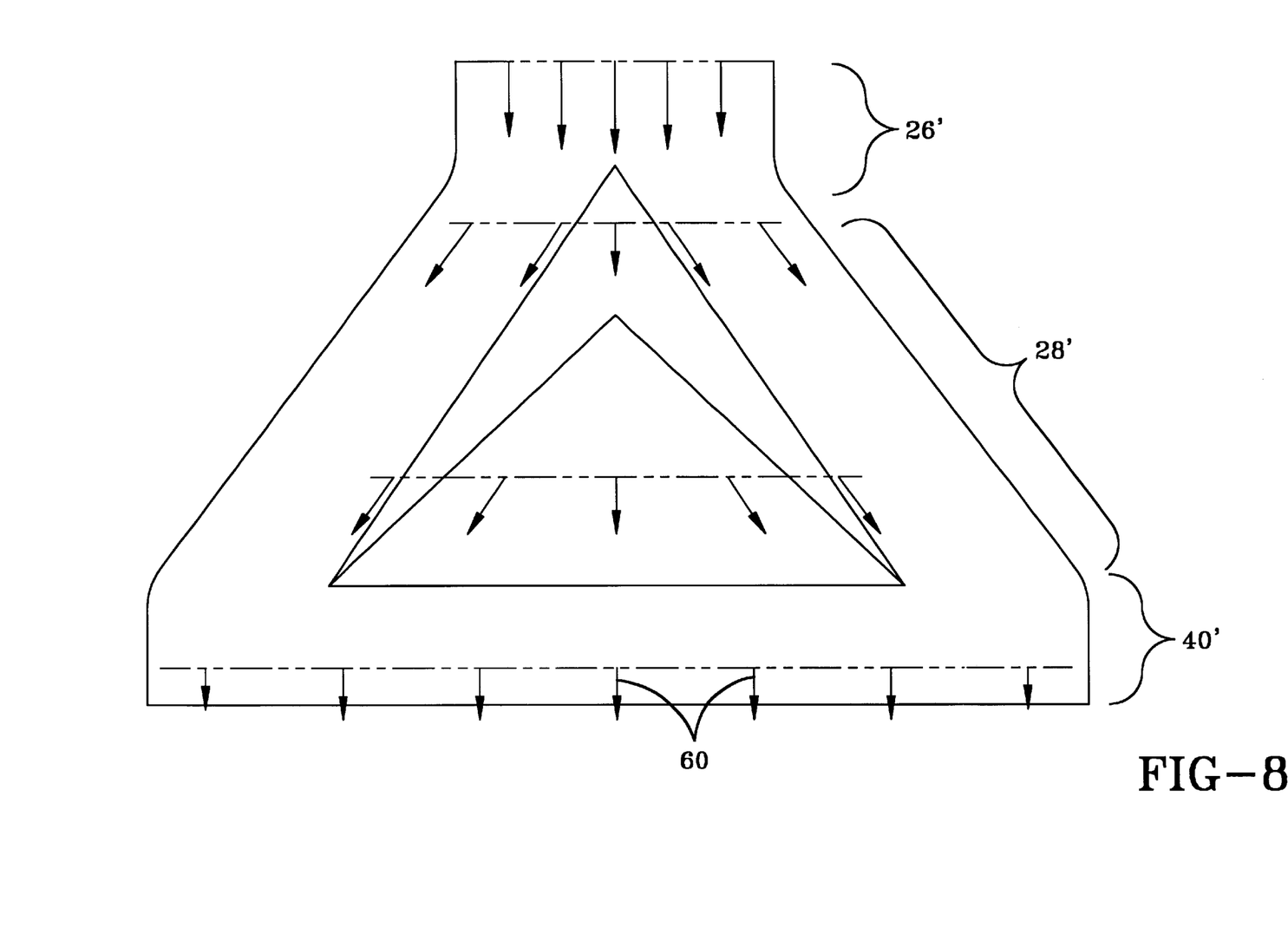
FIG. 8 is a schematic representation of velocity vectors associated with die flow of polymeric material in the flow channel of the present invention.
Figure 9:
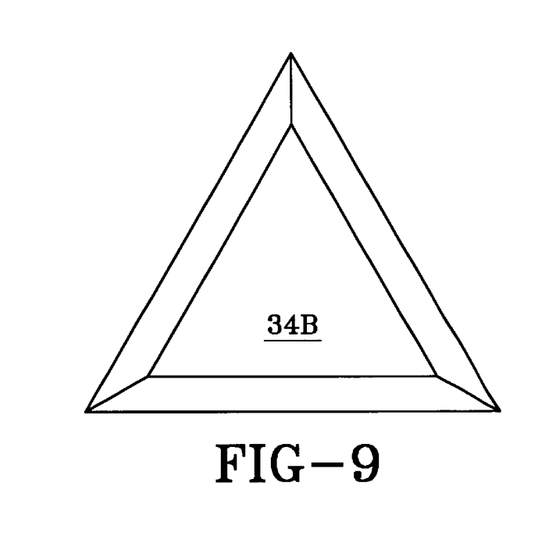
FIGS. 9–12 are top views of various embodiments of a flow directing insert according to the invention.
Figure 10:
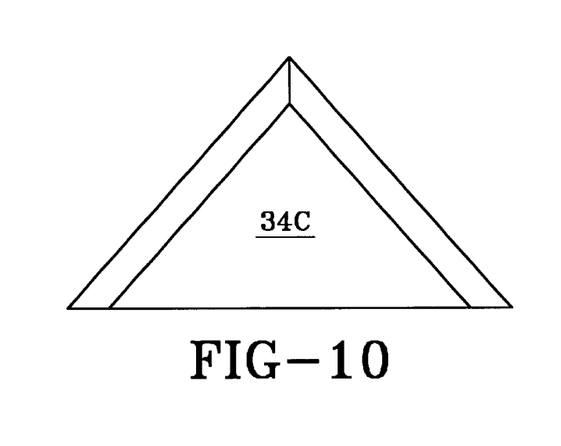
Figure 11:
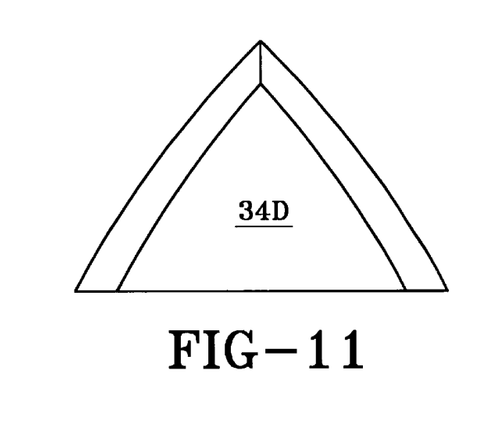
Figure 12:
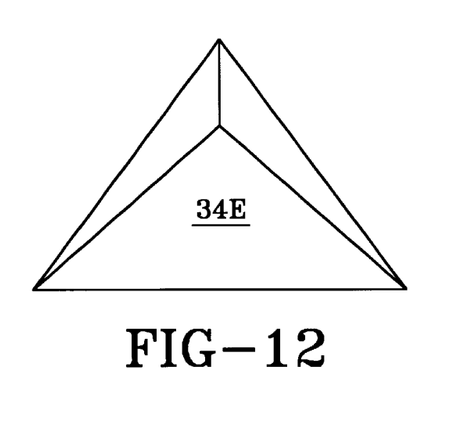

With respect to FIG. 8, the features of the downstream region 11 cause the exiting vectors 60 associated with the velocity of the polymeric material to be substantially equal and parallel to the centerline 18A across the entire width of the exit zone 40. In prior art extruder flow channels, the flow tends to be faster in the center, which causes poor gauge control. Such undesirable effects are greatly reduced by the flow channel construction of the present invention because of the balanced flow and substantially uniform velocity across the exit zone 40.

The design of the downstream region 11 of flow channel 10 of the present invention can be used for single and multiple cavity extrusions. When the polymeric material passes from the exit zone 40 through more than one die cavity, improvement is seen in a balancing of the flow between cavities as well as in uniformity within a given cavity. This versatility for single and multiple cavity extrusions serves to reduce or eliminate flow channel changeovers, and thus increase productivity.

The required clamping force for a specified flow rate of polymeric material is reduced in the flow channel 10 of the present invention because the island 16 dividing the two streams A and B of FIG. 2 greatly reduces the projected area associated with required clamping force, Prior art extruders are equipped to provide higher clamping force for the same flow rate than needed with the flow channel 10. Therefore, use of the inventive flow channel 10 with prior art extruders may allow for increased flow rate or throughput when utilizing similar clamping forces.

Referring now to FIGS. 9–12 different embodiments of a flow-directing insert 34B–34E are shown. The design of inserts 34B–34E seeks to achieve uniform gap-wise average velocity across the exit opening, while minimizing pressure loss.

Figure 13:
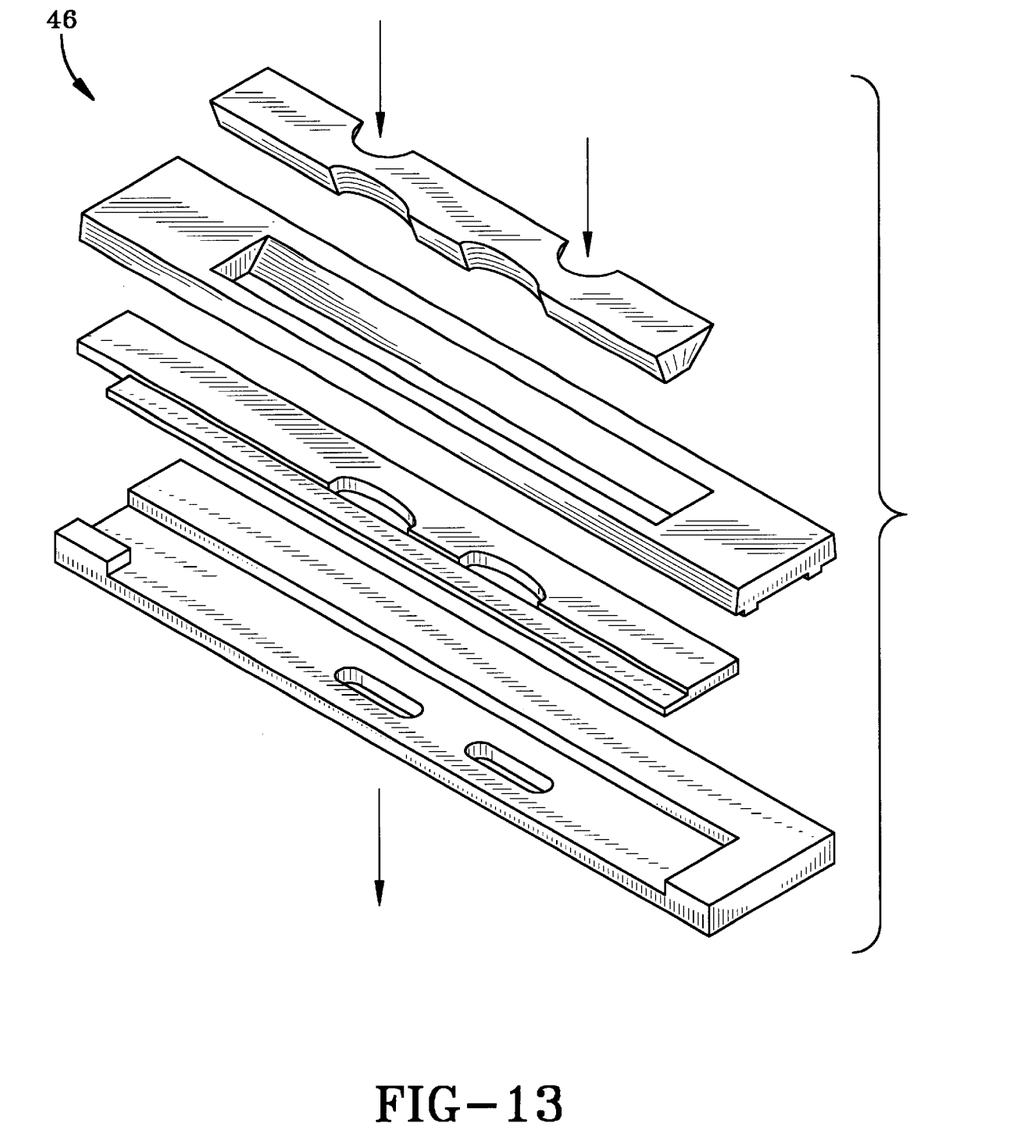
FIG. 13 is an exploded view of a shaping die assembly for shaping extruded material.

FIG. 13 is an exploded view of a shaping die assembly 46 able to receive material that flows from the flow channel 10.

Figure 14:
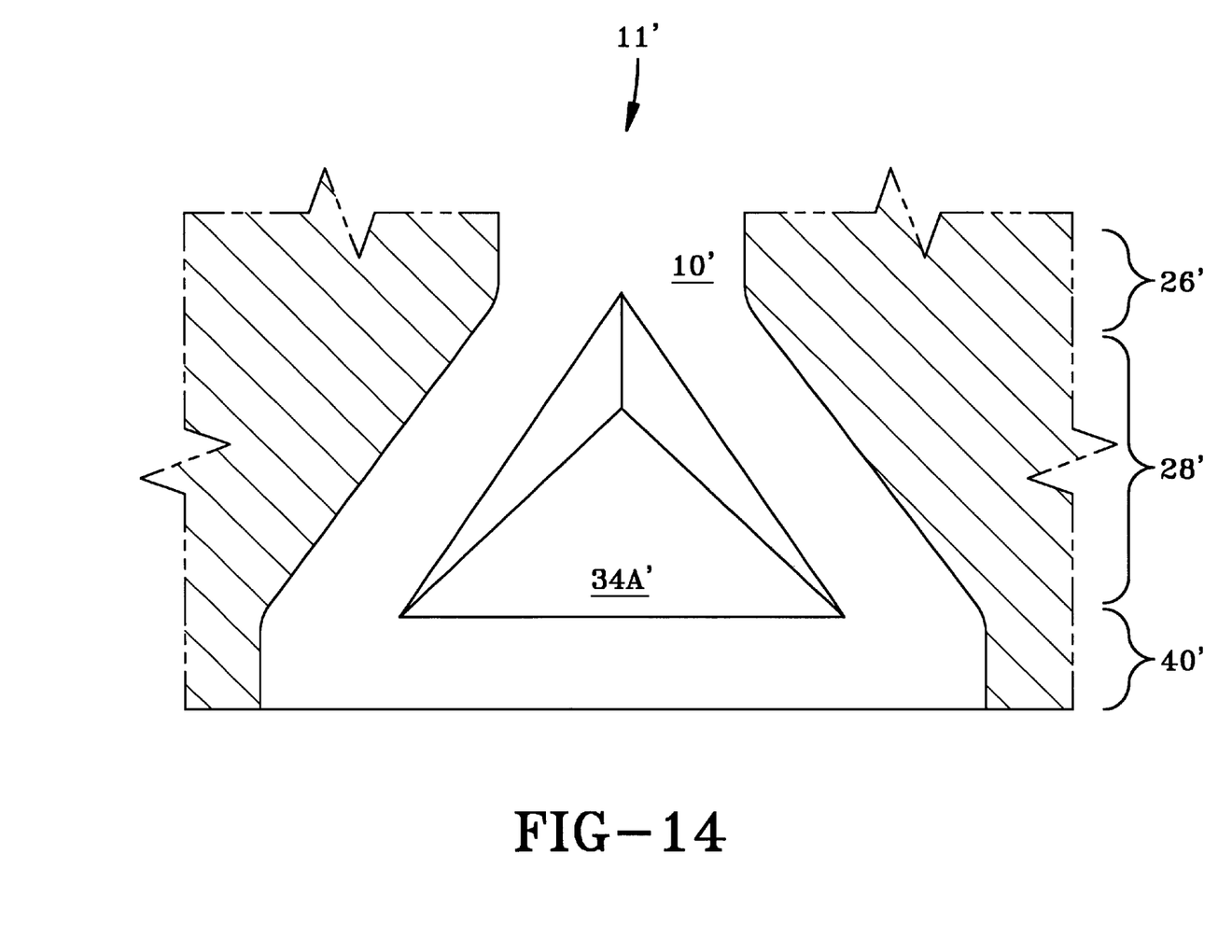
FIG. 14 is a top sectional view of another embodiment of the downstream region of a flow channel according to the invention.

In another embodiment of the invention, shown in FIG. 14, the flow of polymeric material enters the downstream region 11. In this embodiment the features of the flow channel 10' are similar to those described above with respect to the entry zone 26' and the spread out and balancing zone 28'. In the exit zone 40', the lateral width is greater than the maximum width of the flow directing insert 34A'. In this embodiment, the exit zone 40' does not communicate with a second flow branch shown in the embodiment of FIG. 2. It is within the scope of the present invention to provide an apparatus 8 having one or more of the flow channels 10' shown in FIG. 14, each having discrete zones 40'.

It is further within the scope of die present invention to provide an apparatus with more than the two flow branches 15A, 15B as illustrated in FIG. 2, wherein the exit zone 40 is continuous. It is further within the scope of the present invention to provide any combination of flow channels/flow branches having continuous exit zones 40 or discreet zones 40'.

The preferred embodiments of the invention have been described, hereinabove. It will be apparent to those skilled in the art that the above methods may incorporate changes and modifications without departing from the general scope of this invention. It is intended to include all such modifications and alterations in so far as they come within the scope of the appended claims or the equivalent thereof.

Having thus described the invention, it is now claimed:

1. Apparatus for directing the flow of polymeric material from a supply source to one or more shaping dies, the apparatus having a flow channel therein, the flow channel having an inlet communicating with a supply orifice for receiving the material, the flow channel being defined by opposite side walls, an upper wall, and a lower wall, the flow channel including a downstream region having a first zone in flow communication with the inlet, and a second zone in flow communication with the first zone, the first and second zones being associated with a common centerline, the side walls of the second zone diverging in opposite lateral directions generally symmetrically about the centerline and associated with an angle, α, the apparatus being characterized by:
    a substantially triangular flow directing insert located within the second zone positioned adjacent to the lower wall, the flow directing insert having sloped side surfaces intersecting a generally planar top surface, the top surface being spaced from the upper wall in the second zone.

2. The apparatus of claim 1 further characterized by:
    common plane throughout the first and second zones.

3. The apparatus of claim 1 further characterized by:
    a flow directing insert spaced from the opposite side walls.

4. The apparatus of claim 1 further characterized by:
    the top surface being generally parallel to the upper wall.

5. The apparatus of claim 1 further characterized by:
    a third zone in flow communication with the second zone for directing the flow of the material into the one or more shaping dies, the lower wall of the third zone being associated with a plane spaced from the plane of the top surface of the flow directing insert.

6. The apparatus of claim 5 further characterized by:
    the flow directing insert having an associated maximum lateral width; and,
    the third zone including an exit orifice, the exit orifice being associated with an exit orifice width, wherein the exit orifice width is greater than the associated maximum lateral width of the flow directing insert.

7. The apparatus of claim 1 further characterized by:

a third zone in flow communication with the second zone for directing the flow of the material into the one or more shaping dies, the lower wall of the third zone being associated with a plane spaced from the plane of the top surface of the flow directing insert.

8. The apparatus of claim 7 further characterized by:

the flow directing insert having an associated maximum lateral width; and, the third zone including an exit orifice, the exit orifice being associated with an exit orifice width, wherein the exit orifice width is greater than the associated maximum lateral width of the flow directing insert.

9. The apparatus of claim 1 wherein a is between 40' and 120°.

10. The apparatus of claim 1 wherein the upper wall and the lower wall of the flow channel in the second zone are disposed at an angle β to one another to effect a gradual decrease in a channel height in the second zone.

11. The apparatus of claim 10 wherein angle β is between 5° and 30°.

12. Apparatus for directing the flow of polymeric material from a supply source to one or more shaping dies, the apparatus having a flow channel therein, the flow channel having an inlet communicating with a supply orifice for receiving the material, the flow channel being defined by opposite side walls, an upper wall, and a lower wall, the flow channel including a region having a pair of diverging flow, branches in flow communication with the inlet of the flow branches including a first zone in flow communication with the inlet, and a second zone in flow communication with the first zone, the first and second zones being associated with a common the side walls of the second zone diverging in opposite lateral directions general, symmetrically about the centerline and associated with an angle, α, the apparatus being characterized by:

a substantially triangular flow directing insert located within each of the second zones positioned adjacent to the lower wall, the flow directing insert having sloped side surfaces intersecting a generally planar top surface, the top surface being spaced from the upper wall in the second zone.

13. The apparatus of claim 12 further characterized by:

the upper wall being in a common plane throughout the first and second zones.

14. The apparatus of claim 12 further characterized by:

the top surface being generally parallel to the upper wall in the second zone.

15. The apparatus of claim 12 further characterized by:

each of the flow branches including a third zone in flow communication with the second zone for directing the flow of the material into the one or more shaping dies, the lower wall of the third zone being generally flush with the planar top surface of the flow directing insert.

16. The apparatus of claim 15 further characterized by:

the flow directing insert having an associated maximum lateral width; and, each of the third zones including an exit orifice, the exit orifice being associated with an exit orifice width, wherein the exit orifice width is greater than the associated maximum lateral width of the flow directing insert.

17. The apparatus of claim 15 further characterized by:

each of the flow branches including a third zone; and, an exit orifice common to each of the third zones.

18. The apparatus of claim 12 further characterized by:

each of the flow branches including a third zone in flow communication with the second zone for directing the flow of the material into the one or more shaping dies, the lower wall of the third zone being associated with a plane spaced from the plane of the top surface of the flow directing insert.

19. The apparatus of claim 18 further characterized by:

the flow directing insert having an associated maximum lateral width; and, each of the third zones including an exit orifice, the exit orifice being associated with an exit orifice width, wherein the exit orifice width is greater than the associated maximum lateral width of the flow directing insert.

20. The apparatus of claim 18 further characterized by:

each of the flow branches including a third zone; and, an exit orifice common to each of the third zones.

21. The apparatus of claim 12 wherein a is between 40' and 120'.

22. The apparatus of claim 12 wherein the upper wall and the lower wall of the flow channel in the second zone are disposed at an angle β to one another to effect a gradual decrease in a channel height in the second zone.

23. The apparatus of claim 22 wherein angle β is between 5° and 30°.

24. A substantially triangular flow directing insert for use in an apparatus for directing the flow of polymeric material from a supply source to one or more shaping dies, the apparatus having a flow channel therein, the flow channel having an inlet communicating with a supply orifice for receiving the material and being defined by opposite side walls, an upper wall, and a lower wall, the flow channel including a downstream region having a first zone in flow communication with the inlet and a second zone in flow communication with the first zone, the flow directing insert being located within the second zone and characterized by:

a generally planar top surface;

a bottom surface; and, sloping side surfaces extending between the bottom surface and the top surface.

25. The flow directing insert of claim 24 being further characterized by:

the top surface and the bottom surface being non-parallel.

26. The flow directing insert of claim 24 being further characterized by:

an increasing lateral width in symmetrical manner relative to a lateral centerline.

* * * * *

UNITED STATES PATENT AND TRADEMARK OFFICE
CERTIFICATE OF CORRECTION

PATENT NO. : 6,340,123 B1
DATED : January 22, 2002
INVENTOR(S) : Ching-Chih Lee et al.

It is certified that error appears in the above-identified patent and that said Letters Patent is hereby corrected as shown below:

Title page,
Item [75], first-named inventor, please delete "Ching-Chin Lee" and substitute -- Ching-Chih Lee -- therefor.
Item [57], ABSTRACT,
Line 8, delete "mom" and substitute -- more -- therefor.

Column 1,
Line 4, delete "an" and substitute -- art -- therefor.
Line 11, delete "now" and substitute -- flow -- therefor
Line 19, delete "faster" and substitute -- faster, -- therefor.
Line 41, delete "object" and substitute -- objects -- therefor.

Column 2
Line 1, delete "die" and substitute -- the -- therefor.
Line 11, delete "In" and substitute -- in -- therefor.
Line 17, delete the first occurrence of "orifice" and substitute -- orifice, -- therefor.
Line 51, delete "die" and substitute -- the -- therefor.
Line 65, delete "far" and substitute -- for -- therefor.

Column 3,
Line 4, delete "now" and substitute -- flow -- therefor.
Lines 11, 55 and 66, delete "die" and substitute -- the -- therefor.
Line 26, delete "Dow" and substitute -- flow -- therefor.
Line 52, delete "158" and substitute -- 15B -- therefor.
Line 56, delete "he" and substitute -- be -- therefor.
Line 61, delete "3" and substitute -- 8 -- therefor.
Line 64, delete "26," and substitute -- 26 -- therefor.
Line 67, delete "14," and substitute -- 14. -- therefor.

UNITED STATES PATENT AND TRADEMARK OFFICE
CERTIFICATE OF CORRECTION

PATENT NO. : 6,340,123 B1
DATED : January 22, 2002
INVENTOR(S) : Ching-Chih Lee et al.

It is certified that error appears in the above-identified patent and that said Letters Patent is hereby corrected as shown below:

Column 4,
Line 7, delete "a".
Lines 17 and 38, delete "die" and substitute -- the -- therefor.
Line 19, delete "29" and substitute -- 28 -- therefor.
Line 46, delete "or" and substitute -- of -- therefor.
Line 48, delete "41," and substitute -- 41. -- therefor.

Column 5,
Line 5, delete "15B," and substitute -- 15B -- therefor.
Line 10, delete "37" and substitute -- 48 -- therefor,
Line 14, insert -- . -- following "15A".
Line 24, delete "-embodiment" and substitute -- embodiment -- therefor.
Line 25, delete "constant," and substitute therefor -- constant -- therefor.
Line 57, delete "force," and substitute -- force. -- therefor.

Column 6,
Line 5, delete "11" and substitute -- 11' -- therefor.
Line 11, insert -- as -- following "branch".
Line 14, insert --exit -- following "discrete"
Line 19, insert -- exit -- following "discrete"
Line 51, insert -- upper wall being in a -- prior to "common".
Lines 61-62, delete "associated with a plane spaced from the plane of the" and substitute -- generally flush with the planar --.

Column 7,
Line 17, delete "a" and insert -- $\alpha$ -- therefor.
Line 17, delete "40" and insert -- 40° -- therefor.
Line 31, insert -- downstream -- prior to "region".
Line 31, delete "flow," and insert -- flow -- therefor.
Line 32, insert -- , each -- following "inlet".
Line 36, insert -- centerline, -- following "common".
Line 37, delete "general," and substitute -- generally -- therefor.

UNITED STATES PATENT AND TRADEMARK OFFICE
CERTIFICATE OF CORRECTION

PATENT NO.    : 6,340,123 B1
DATED         : January 22, 2002
INVENTOR(S)   : Ching-Chih Lee et al.

It is certified that error appears in the above-identified patent and that said Letters Patent is hereby corrected as shown below:

Column 8,
Line 29, delete "a" and substitute -- α -- therefor.
Line 29, delete "40'" and substitute -- 40° -- therefor.
Line 30, delete "120'" and substitute -- 120° -- therefor.

Signed and Sealed this

Seventeenth Day of June, 2003

JAMES E. ROGAN
*Director of the United States Patent and Trademark Office*